United States Patent [19]
Tamic

[11] Patent Number: 6,127,042
[45] Date of Patent: Oct. 3, 2000

[54] CAPACITOR HAVING A POLYPROPYLENE DIELECTRIC, AND A METALLIZED FILM FOR MAKING SUCH A CAPACITOR

[75] Inventor: Lucien Tamic, Ergue-Gaberic, France

[73] Assignee: Bollore Technologies, France

[21] Appl. No.: 09/000,355

[22] PCT Filed: Jun. 26, 1996

[86] PCT No.: PCT/FR96/01189

§ 371 Date: Jan. 29, 1998

§ 102(e) Date: Jan. 29, 1998

[87] PCT Pub. No.: WO97/05634

PCT Pub. Date: Feb. 13, 1997

[30] Foreign Application Priority Data

Jul. 28, 1995 [FR] France .................................. 95 09244

[51] Int. Cl.[7] .............................. B32B 15/08; H01G 4/00; H01G 4/06
[52] U.S. Cl. ..................... 428/461; 428/500; 361/301.3; 361/311
[58] Field of Search ...................................... 428/461, 500; 361/311, 312, 313, 301.3; 29/25.41, 25.42

[56] References Cited

U.S. PATENT DOCUMENTS

| | | | |
|---|---|---|---|
| 4,185,148 | 1/1980 | Sato et al. | 526/348.1 |
| 4,211,811 | 7/1980 | Bordini et al. | 428/220 |
| 4,226,011 | 10/1980 | Hunt | 29/25.42 |
| 4,267,565 | 5/1981 | Puppolo et al. | 361/433 |
| 4,325,167 | 4/1982 | Rosenberg | 29/25.42 |
| 4,439,810 | 3/1984 | Shimada et al. | 361/272 |
| 4,488,203 | 12/1984 | Muranaka et al. | 361/433 |
| 4,516,187 | 5/1985 | Lavene | 361/309 |
| 4,803,027 | 2/1989 | Peiffer et al. | 264/210.5 |
| 5,061,549 | 10/1991 | Shores | 428/207 |
| 5,223,585 | 6/1993 | Mizuno et al. | 525/471 |
| 5,610,796 | 3/1997 | Lavene | 361/303 |
| 5,614,111 | 3/1997 | Lavene | 219/121.59 |
| 5,716,570 | 2/1998 | Peiffer et al. | 264/146 |
| 5,724,222 | 3/1998 | Hirano et al. | 361/311 |

*Primary Examiner*—Paul Thibodeau
*Assistant Examiner*—Kevin R. Kruer
*Attorney, Agent, or Firm*—Blakely Sokoloff Taylor & Zafman

[57] ABSTRACT

A metallized polypropylene film that has a modulus of elasticity in bending higher than 1500 MPa, a sag point under load higher than 110° C., and a Vicat point higher than 150° C. The metallized film is a film for making a capacitor.

13 Claims, 1 Drawing Sheet

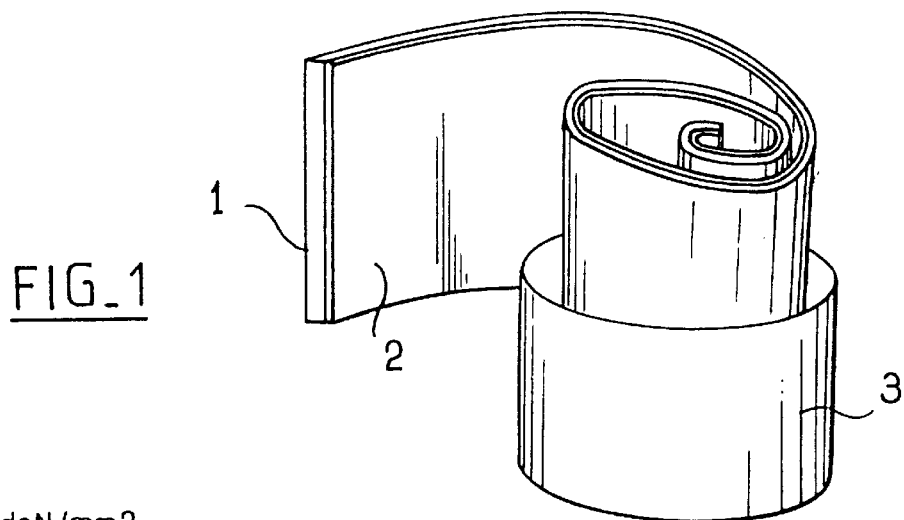
FIG_1
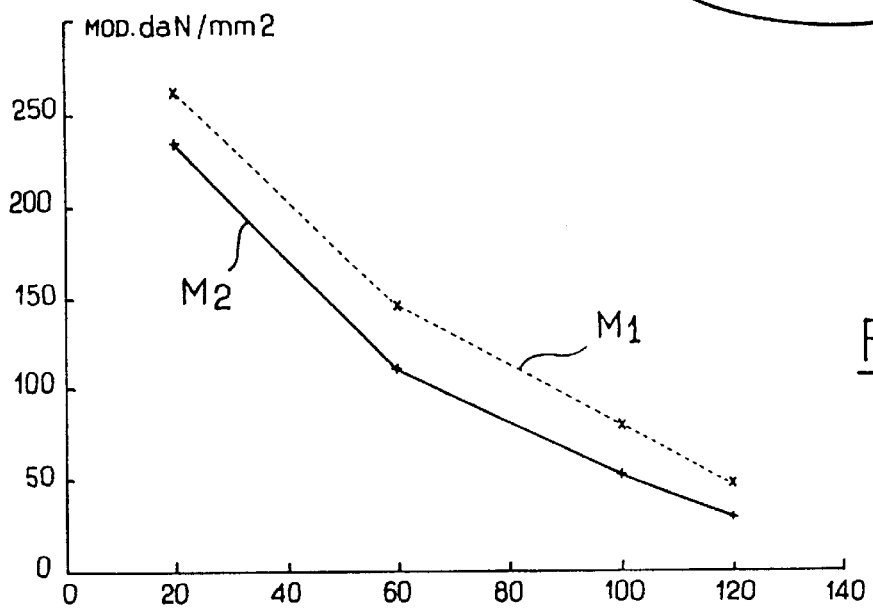
FIG_2
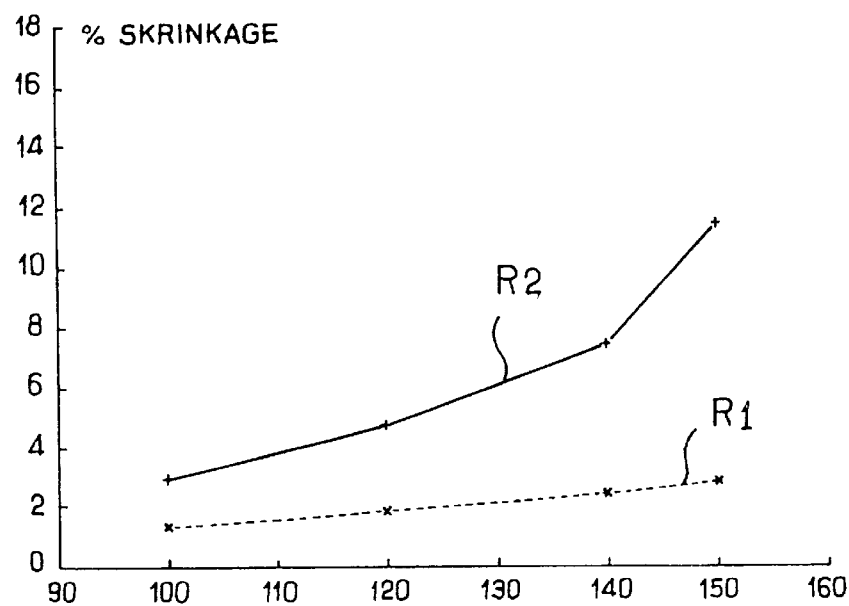
FIG_3

CAPACITOR HAVING A POLYPROPYLENE DIELECTRIC, AND A METALLIZED FILM FOR MAKING SUCH A CAPACITOR

This application is filed under 35 U.S.C. 371 in order to enter into the U.S. national stage under PCT based upon the international application filed Jul. 26, 1996, as PCT/FR96/01189.

BACKGROUND OF THE INVENTION

The present invention relates to capacitors having polypropylene dielectrics. It also relates to films for making such capacitors.

Numerous polypropylene films are already used as dielectric films for capacitors.

BRIEF SUMMARY OF THE INVENTION

An object of the present invention is to provide a novel polypropylene film for capacitors, which film offers a better temperature rating than known prior art films, thereby making it possible to improve the reliability of capacitors and to extend their rated temperature range.

The present invention achieves this object by providing a dielectric made of a polypropylene that has a modulus of elasticity in bending higher than 1500 MPa, a sag point under load higher than 110° C., and a Vicat point higher than 150° C.

The modulus of elasticity in bending, the sag point, and the Vicat point are measured in compliance respectively with the following Standards: ASTM D 790; ASTM D 648 (load of 455 MPa—temperature variation of 2° C. per minute); and ASTM D 1525—method A (load of 1 kg—temperature variation of 50° C. per hour).

The invention also provides metallized films for making capacitors of this type.

Other characteristics and advantages of the invention appear from the following description which is given purely by way of non-limiting example and should be read with reference to the accompanying drawings.

BRIEF DESCRIPTION OF THE DRAWINGS

FIG. 1 is a diagrammatic perspective view of a capacitor film of the invention;

FIG. 2 is a comparative graph on which curves are plotted showing modulus of elasticity as a function of temperature for a polypropylene film of the invention and for a prior art capacitor film; and FIG. 3 is a comparative graph on which curves are plotted showing percentage of shrinkage as a function of temperature for the two films.

DETAILED DESCRIPTION OF THE INVENTION

A capacitor of the invention may be a capacitor in which the polypropylene film and the electrodes are separate, or else, as shown in FIG. 1, it may be made up of metallized polypropylene films.

The capacitor shown in FIG. 1 includes a substrate 1 constituted by a polypropylene film on which one or more layers 2 of a metal such as aluminum and/or zinc or an alloy of aluminum and of zinc are deposited using techniques known per se to a person skilled in the art.

The resulting metallized film is rolled up as shown in FIG. 1. The roll may be covered with a protective covering 3 of a thermosettable resin, of a coating wax, or of a dielectric liquid.

For example, the substrate 1 may be a 6-$\mu$m polypropylene film metallized with a layer of pure zinc which has a surface resistance lying in the range 5 $\Omega$ per square to 10 $\Omega$ per square.

The protective covering 3 is constituted by a polyurethane thermosettable resin.

According to the invention, the polypropylene of the substrate 1 is chosen to have the following characteristics:

it has a modulus of elasticity in bending as determined in compliance with the ASTM D 790 Standard that is higher than 1500 MPa;

its sag point under load as determined in compliance with the ASTM D 648 Standard is higher than 110° C.; and its Vicat softening point as determined in compliance with method A of the D 1525 Standard is higher than 150° C.

It further offers high dielectric quality.

For example, such a polypropylene may be the polypropylene sold by Himont under the trade name Adstif T 2101 F.

The thermo-mechanical properties of the above-described film are shown in FIGS. 2 and 3 by the curves M1 and R1 (dashed-line curves on which the measured points are marked by * signs).

In the figures, the curves M2 and R2 (solid-line curves on which the measured points are marked by + signs) correspond to the curves of modulus and of shrinkage as a function of temperature of the polypropylene sold by Shell under the name JD6900.

As is understood from reading these figures, the metallized film of the invention has a modulus of elasticity that is significantly higher than those of the prior art films. The modulus of elasticity of the film of the invention (as measured in compliance with the ASTM D 882 Standard) is about 80 daN/mm$^2$ (800 MPa) at 100° C., and is 50 daN/mm$^2$ (500 MPa) at 120° C., whereas for conventional films, it is 52 daN/mm$^2$ (520 MPa) and 30 daN/mm$^2$ (300 MPa) respectively at these temperatures.

In addition, the film of the invention offers much lower heat-shrinkage than the films conventionally used in the prior art. For the film of the invention, the percentage of heat-shrinkage in the machine direction is about 1.9% at 120° C. and about 2.5% at 140° C. For prior art films, the percentage of heat-shrinkage is respectively 5% and 7.8% at these two temperatures.

It should be noted that, because of this improved dimensional stability, the films proposed by the invention are less sensitive to electrical breakdown of thermo-mechanical origin; in the event of local heating up under the effect of a conduction current through the film, less creep is undergone by films of the invention than by prior art films. Creep phenomena are favorable to dielectric breakdown in particular in long-term behavior.

Furthermore, it should also be noted that metallized polypropylene films of the invention are suitable for withstanding surface resistances that are higher for the layers of metallization (resistances of higher than 10 $\Omega$ per square), which considerably improves the AC breakdown voltage of the capacitor.

This result is important because, for capacitors having metallized films, the increase in the resistance of the layers of metallization gives rise to an increase in the dielectric losses of the capacitor; this increase leads to the dielectric heating up which becomes rapidly unacceptable in prior art polypropylene films.

The polypropylene film of the invention which is more temperature stable accepts a slight increase in the dielectric losses of the capacitor, and the resulting heating up. It is thus possible to deposit on the film a finer metal layer (higher Ω per square) and thus to obtain breakdown voltages that are higher under AC conditions. As a result, the polypropylene films proposed by the invention make it possible to take full advantage in terms of reliability of a slight increase in the surface resistance of the layer of metallization.

Furthermore, as will have been understood, the polypropylene film that the invention proposes to use for its capacitors is suitable for withstanding heat treatment at a temperature higher than that which can be withstood by a conventional capacitor film.

This makes it possible to melt the polypropylene partially (by heating to 140° C.), thereby improving the adhesion between the turns of the roll. As a result, gaseous exchanges with the atmosphere are reduced so that self-protection is provided with the film proposed by the invention. In addition, the resulting roll is more compact.

The roll may also be protected by means of a surface layer of some other heat-sealable polymer (e.g. propylene ethylene copolymer, or polybutylene). Such a protection is not possible with dielectric films used in prior art capacitors, whereas depositing such a heat-sealable protective polymer layer is possible with the polypropylene films proposed by the invention since they have a sufficiently high temperature rating for the heat treatment necessary for heat-sealing the surface layer.

In addition, the polypropylene is advantageously a polypropylene treated with nucleating agents, thereby making it possible to increase the sag point.

The following tables give the results of accelerated ageing tests (Table 1) and of breakdown strength tests (Table 2), the results being obtained firstly with a capacitor whose dielectric film was a polypropylene used conventionally in the prior art, and secondly with a capacitor of the type described with reference to FIG. 1.

TABLE 1

Accelerated ageing test (24 hours at each test voltage and at each test temperature)

| | Conventional film | | Film of the invention | | |
|---|---|---|---|---|---|
| V/μm | 100° C. | 120° C. | 100° C. | 120° C. | |
| 75 | 0 | 0 | 0 | 0 | % |
| 90 | 0 | 0 | 0 | 0 | breakdown |
| 105 | 10 | 20 | 0 | 5 | |
| 115 | 20 | 100 | 0 | 40 | |
| 125 | 100 | / | 33 | 100 | |

Other tests were performed with films of the invention whose metallized films have resistance lying in the range 10 Ω per square to 15 Ω per square. A slight reduction in the number of breakdowns was observed for these films.

TABLE 2

Tests on the stability of the capacitance ΔC/C of the capacitors (thickness of the film: 8 μm - metallization with aluminum - capacitor protected with wax).

| | Heat treatment | Conventional film R = 3 Ω per square | Film of the invention R = 3 Ω per square |
|---|---|---|---|
| ΔC/C % | 115° C. | −2.56 | −2.79 |
| | 140° C. | Breakdown | −1.04 |

As will have been understood, the polypropylene film proposed as a dielectric for capacitors of the invention offers the following advantages:
- an increase of 20° C. or more in the maximum operating temperature;
- an improvement in the reliability of the capacitor at usual operating temperatures; and
- the possibility of simplifying protecting the capacitors when they have metallized films.

What is claimed is:

1. A metallized polypropylene film for a capacitor, said film being characterized in that the polypropylene substrate has a modulus of elasticity in bending higher than 1500 MPa, a sag point under load higher than 110° C., and a Vicat point higher than 150° C.

2. A film according to claim 1, characterized in that the layer of metallization has surface resistance higher than 10 Ω per square.

3. A film according to claim 2, characterized in that the surface resistance of the layer of metallization is less than 15 Ω per square.

4. A film according to any one of claims 1 to 3, characterized in that it has a protective layer made of a heat-sealable polymer.

5. A film according to claim 4, characterized in that the heat-sealable polymer is a propylene ethylene copolymer or a polybutylene.

6. A film according to claim 1, characterized in that the polypropylene of the substrate is a polypropylene treated with nucleating agents.

7. A capacitor whose dielectric is made of a polypropylene, said capacitor being characterized in that the polypropylene has a modulus of elasticity in bending higher than 1500 MPa, a sag point under load higher than 110° C., and a Vicat point higher than 150° C.

8. A capacitor according to claim 7 characterized in that the polypropylene is polypropylene that is treated with nucleating agents.

9. A capacitor of the type comprising a rolled-up metallized dielectric film said capacitor being characterized in that it constitutes a capacitor according to claim 1.

10. A capacitor according to claim 9, characterized in that the layer of metallization has surface resistance higher than 10 Ω per square.

11. A capacitor according to claim 9 or 10, characterized in that the turns of the roll adhere to one another by being partially melted.

12. A capacitor according to claim 9, characterized in that the roll has a protective layer made of a heat-sealable polymer.

13. A capacitor according to claim 12, characterized in that the heat-sealable polymer is a propylene ethylene copolymer or a polybutylene.

* * * * *

UNITED STATES PATENT AND TRADEMARK OFFICE
CERTIFICATE OF CORRECTION

PATENT NO. : 6,127,042
DATED : October 3, 2000
INVENTOR(S) : Tamic

Page 1 of 1

It is certified that error appears in the above-identified patent and that said Letters Patent is hereby corrected as shown below:

<u>Title page,</u>
Under PCT Filed, Item [22], delete "Jun." and insert Jul. --
Under PCT No., Item [86], after §371 Date:, delete "Jan. 29, 1998" and insert
-- Jan 28, 1998 --; also after § 102(e) Date:, delete "Jan. 29, 1998" and insert
-- Jan. 28, 1998

<u>Drawing Sheets,</u>
FIG 2., -- above and to the right of graph number 140, insert -- Temperature -- as the designation for that side of the graph
FIG 3., -- above and to the right of graph number 140, insert -- Temperature -- as the designation for that side of the graph; also, after the symbol "%" in the upper left, delete "SKRINKAGE" and insert -- SHRINKAGE --

<u>Claim 6, column 4,</u>
Line 40, delete "treated with" and insert -- containing --

Signed and Sealed this

Thirtieth Day of October, 2001

Attest:

*Nicholas P. Godici*

NICHOLAS P. GODICI
*Attesting Officer*   *Acting Director of the United States Patent and Trademark Office*